United States Patent
Books

(10) Patent No.: US 9,020,669 B2
(45) Date of Patent: Apr. 28, 2015

(54) HYBRID VEHICLE DRIVER COACH

(75) Inventor: Martin T Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1121 days.

(21) Appl. No.: 12/981,079

(22) Filed: Dec. 29, 2010

(65) Prior Publication Data
US 2012/0173057 A1   Jul. 5, 2012

(51) Int. Cl.
*B60W 20/00* (2006.01)
*B60K 31/00* (2006.01)
*B60W 50/14* (2012.01)
*B60W 10/26* (2006.01)
*B60W 30/18* (2012.01)

(52) U.S. Cl.
CPC ........... *B60W 50/14* (2013.01); *B60W 10/26* (2013.01); *Y10S 903/902* (2013.01); *B60W 2710/244* (2013.01); *B60W 2510/244* (2013.01); *B60W 20/00* (2013.01); *B60W 30/18127* (2013.01); *B60W 2050/146* (2013.01); *B60W 2520/105* (2013.01); *B60W 2540/30* (2013.01); *B60W 2720/103* (2013.01); *B60W 2720/106* (2013.01); *Y10S 903/903* (2013.01)

(58) Field of Classification Search
USPC ............................ 701/22, 70; 903/903, 907
See application file for complete search history.

(56) References Cited

U.S. PATENT DOCUMENTS

| | | | |
|---|---|---|---|
| 4,214,381 A | 7/1980 | Clark et al. | |
| 5,528,148 A * | 6/1996 | Rogers | 320/137 |
| 6,367,570 B1 | 4/2002 | Long, III et al. | |
| 6,719,076 B1 * | 4/2004 | Tabata et al. | 180/65.7 |
| 6,724,300 B2 * | 4/2004 | Miyakoshi et al. | 340/435 |
| 6,856,034 B2 | 2/2005 | Peters et al. | |
| 6,862,511 B1 | 3/2005 | Phillips et al. | |
| 6,925,425 B2 | 8/2005 | Remboski et al. | |
| 7,113,839 B2 | 9/2006 | Ferguson et al. | |
| 7,214,110 B1 * | 5/2007 | Ehlers et al. | 440/1 |
| 7,275,518 B1 | 10/2007 | Gartner et al. | |
| 7,487,852 B2 | 2/2009 | Leone et al. | |
| 7,502,679 B2 * | 3/2009 | Tabata et al. | 701/70 |
| 7,640,744 B2 | 1/2010 | Rolling et al. | |
| 7,672,770 B2 * | 3/2010 | Inoue et al. | 701/70 |
| 7,765,058 B2 | 7/2010 | Doering | |
| 7,792,628 B2 | 9/2010 | Aswanu et al. | |
| 7,798,578 B2 | 9/2010 | Lewis et al. | |
| 8,251,463 B2 * | 8/2012 | Worrel | 303/151 |
| 2002/0116099 A1 * | 8/2002 | Tabata et al. | 701/22 |
| 2004/0236476 A1 * | 11/2004 | Chowdhary | 701/1 |
| 2005/0278055 A1 | 12/2005 | Ferguson et al. | |
| 2006/0060399 A1 * | 3/2006 | Tabata et al. | 180/65.2 |
| 2007/0168104 A1 * | 7/2007 | Nelson et al. | 701/93 |
| 2007/0173372 A1 * | 7/2007 | Ueno | 477/3 |
| 2009/0043467 A1 | 2/2009 | Filev et al. | |
| 2010/0324796 A1 * | 12/2010 | Takeuchi et al. | 701/70 |
| 2012/0094802 A1 * | 4/2012 | Noumura | 477/121 |
| 2012/0184405 A1 * | 7/2012 | Morimura et al. | 477/54 |

* cited by examiner

Primary Examiner — Tuan C. To
(74) Attorney, Agent, or Firm — Krieg DeVault LLP

(57) ABSTRACT

An apparatus includes a deceleration definition module that interprets a target deceleration rate, a deceleration detection module that identifies a vehicle deceleration event, and a deceleration quality module that identifies a deceleration improvement opportunity in response to the target deceleration rate and the vehicle deceleration event. The apparatus further includes an operator feedback module that provides a specific operator guidance in response to the deceleration improvement opportunity.

26 Claims, 4 Drawing Sheets

HYBRID VEHICLE DRIVER COACH

BACKGROUND

The technical field generally relates to vehicle power trains having more than one power source, and more particularly but not exclusively to vehicle power trains having an internal combustion engine power source and an electric motor power source. Hybrid powered vehicles provide the opportunity for improved fuel economy in many applications. Among the opportunities to improve fuel economy include operating the internal combustion engine in a more favored operating condition for a greater percentage of the overall operating time, and recovering a portion of the vehicle kinetic energy during braking operations. However, certain driver behaviors can reduce or eliminate the benefits of the hybrid power train. Additionally, certain driver behaviors can increase the wear on vehicle components, including components found in a hybrid power train. Therefore, further technological developments are desirable in this area.

SUMMARY

One embodiment is a unique method for providing specific operator guidance to improve operations of a hybrid power train. Further embodiments, forms, objects, features, advantages, aspects, and benefits shall become apparent from the following description and drawings.

DESCRIPTION OF THE ILLUSTRATIVE EMBODIMENTS

Figure 1:
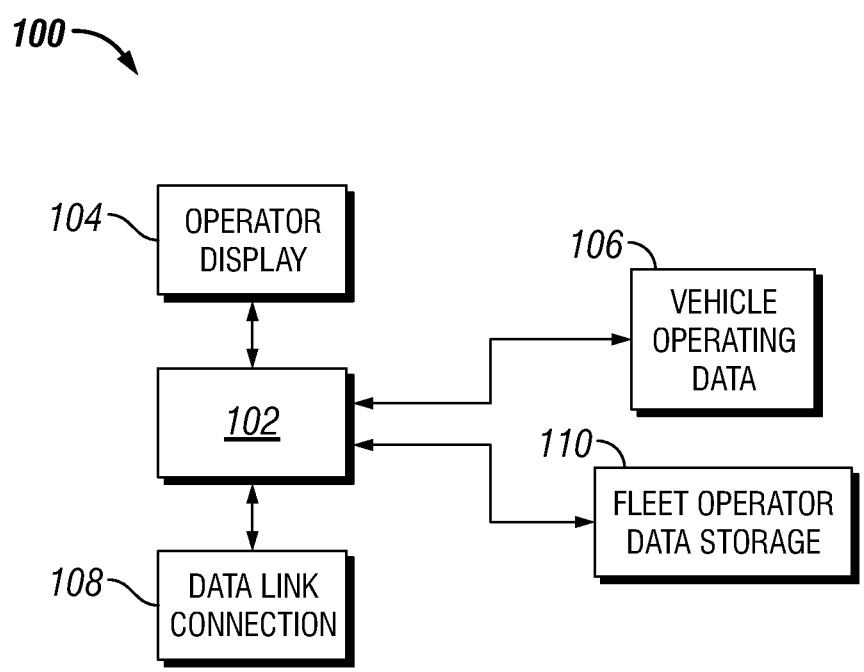
FIG. 1 is a schematic diagram of a system for providing specific operator guidance for more efficient operation of a hybrid power train.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an exemplary system 100 for providing hybrid vehicle operation feedback is shown. The system 100 includes a vehicle having a hybrid power train and at least two power sources. Any type of vehicle and hybrid power train known in the art is contemplated herein. Vehicles and hybrid power trains in any configuration (e.g. series, parallel, series-parallel, or other configuration) are well known in the art, and the vehicle and hybrid power train are not shown herein to avoid obscuring aspects of the present description. One of the power sources includes a regenerative device that at least intermittently recovers vehicle kinetic energy. One example includes a generator that is selectively mechanically coupled to the vehicle wheels and electrically coupled to an energy storage device. The vehicle further includes a service brake that dissipates the vehicle kinetic energy.

The system 100 further includes a controller 102 having modules structured to functionally execute operations to provide useful driver feedback. The controller includes a deceleration definition module that interprets a target deceleration rate, a deceleration detection module that identifies a vehicle deceleration event, a deceleration quality module that identifies a deceleration improvement opportunity in response to the target deceleration rate and the vehicle deceleration event, and an operator feedback module that provides a specific operator guidance in response to the deceleration improvement opportunity.

In certain embodiments, the controller 102 forms a portion of a processing subsystem including one or more computing devices having memory, processing, and communication hardware. The controller 102 may be a single device or a distributed device, and the functions of the controller may be performed by hardware or software. The description herein including modules emphasizes the structural independence of the aspects of the controller 102, and illustrates one grouping of operations and responsibilities of the controller 102. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

The controller 102 is in communication with vehicle operating data 106, which may be provided by a separate controller (not shown), by hardware devices electrically coupled to the controller 102, by a datalink (not shown), and/or by portions of the processing subsystem that provide the vehicle operating data 106 to the controller 102. Exemplary, non-limiting vehicle operating data 106 include one or more of: vehicle speed, engine speed, current gear or gear ratio, battery state-of-charge, accelerator pedal position, service brake position, and/or service braking effort. Any other parameter in the system 100 may further be supplied to the controller 102 according to the description and claims herein. The exemplary system 100 further includes an operator visible display 104 responsive to the specific operator guidance. The controller 102 provides the specific operator guidance to the operator visible display 104, to a fleet operator data storage 110, to a datalink connection 108, and/or to any output device as understood in the art and/or described herein.

Figure 2:
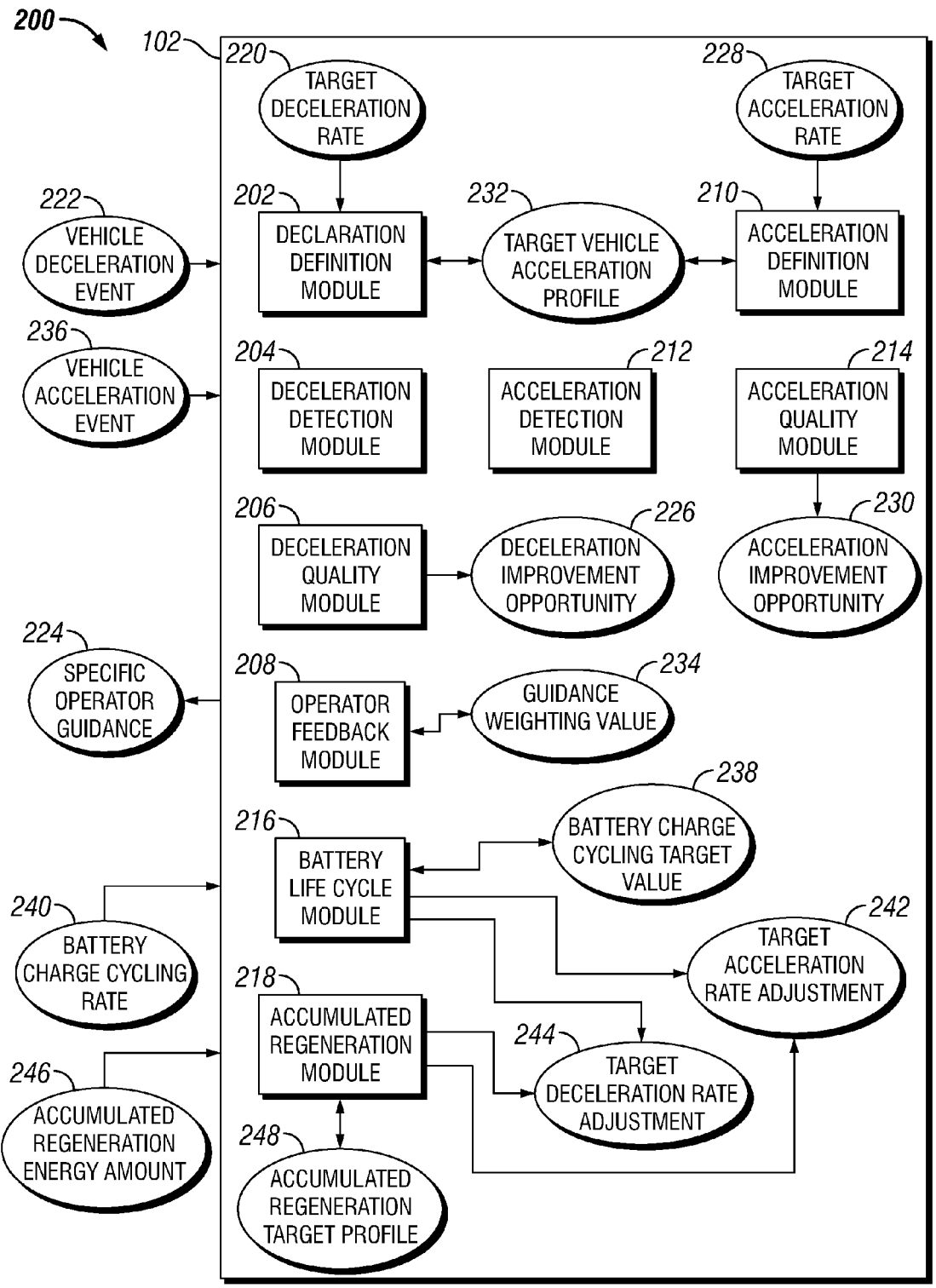
FIG. 2 is a schematic illustration of a controller structured to functionally execute operations for providing specific operator guidance.

Referencing FIG. 2, an exemplary processing subsystem 200 is illustrated including a controller 102. Certain operations of the controller 102 are described herein as interpreting operations. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 102 includes a deceleration definition module 202 that interprets a target deceleration rate 220, a deceleration detection module 204 that identifies a vehicle deceleration event 222, and a deceleration quality module 206 that identifies a deceleration improvement opportunity 226 in response to the target deceleration rate 220 and the vehicle deceleration event 222. The controller 102 further includes an operator feedback module 208 that provides a specific operator guidance 224 in response to the deceleration improvement opportunity 226.

An exemplary system 100 further includes an operator compartment display 104 responsive to the specific operator guidance 224. A further embodiment of the controller 102 includes an acceleration definition module 210 that interprets a target acceleration rate 228, an acceleration detection module 212 that identifies a vehicle acceleration event 236, and an acceleration quality module 214 that identifies an acceleration improvement opportunity 230 in response to the target acceleration rate 228 and the vehicle acceleration event 236. The operator feedback module 208 further provides the specific operator guidance 224 in response to the acceleration improvement opportunity 230.

An exemplary controller 102 further includes a battery life cycle module 216 that interprets a battery charge cycling target value 238 and a battery charge cycling rate 240, and further adjusts the target acceleration rate 228 (e.g. by providing a target acceleration rate adjustment 242) in response to the battery charge cycling target value 238 and the battery charge cycling rate 240. For example, the battery charge cycling target value 238 may be a frequency of battery charge cycles that are nominally expected or designed for the system. In certain embodiments, the expected life of the battery may be a set number of years, and accordingly a number of battery charge cycles per month (or other selected time frame) may be expected. In alternative embodiments, the battery charge cycling target value 238 may be provided as a function of operating time of the system, vehicle miles driven, kwh of energy provided by the hybrid power train to a vehicle load, or by any other battery life consumption function known in the art. Additionally or alternatively, the battery charge cycling target value 238 may be a value selected to provide a battery life decline on a schedule—for example linear decline over time, exponential decline over time, or other decline schedule understood in the art. In certain embodiments, the battery life cycle module 216 increases the target acceleration rate 228 when the battery charge cycling rate 240 is below the battery charge cycling target value 238, and decreases the target acceleration rate 228 when the battery charge cycling rate 240 is above the battery charge cycling target value 238.

Another exemplary controller 102 includes an accumulated regeneration module 218 that interprets an accumulated regeneration target profile 248 and an accumulated regeneration energy amount 246, and further adjusts the target deceleration rate 220 (e.g. by providing a target deceleration rate adjustment 244) and/or the target acceleration rate 228 (e.g. by providing a target acceleration rate adjustment 242) in response to the accumulated regeneration target profile 248 and the accumulated regeneration energy amount 246. The accumulated regeneration target profile 248 is a description of the target amount of energy regenerated to the battery. The accumulated regeneration target profile 248 is a description of the amount of energy expected or desired to be regenerated per unit time, unit of work, unit of operating time, or other selected unit.

The accumulated regeneration energy amount 246 is an amount of energy provided to the battery, and may exclude, in certain embodiments, useful energy recovered that is not applied to charging the battery (e.g. energy provided to an electrical bus to meet current accessory power requirements). In certain embodiments, in response to the accumulated regeneration energy amount 246 exceeding the accumulated regeneration target profile 248, the accumulated regeneration module 218 decreases the target deceleration rate 220 and/or the target acceleration rate 228. In certain embodiments, in response to the accumulated regeneration energy amount 246 being below the accumulated regeneration target profile 248, the accumulated regeneration module 218 increases the target deceleration rate 220 and/or the target acceleration rate 228.

The descriptions which follow provide illustrative embodiments of performing procedures for providing specific operator guidance for more efficient operation of a hybrid power train. Operations illustrated are understood to be exemplary only, and operations may be combined or divided, and added or removed, as well as re-ordered in whole or part, unless stated explicitly to the contrary herein. Certain operations described may be implemented by a computer executing a computer program product on a computer readable medium, where the computer program product comprises instructions causing the computer to execute one or more of the operations, or to issue commands to other devices to execute one or more of the operations.

An exemplary procedure includes an operation to determine a target deceleration rate, an operation to detect a vehicle deceleration event, and an operation to determine a deceleration improvement opportunity in response to the target deceleration rate and the vehicle deceleration event. Exemplary operations to determine the target deceleration rate include accessing a memory location or datalink communication to determine the target deceleration rate. The target deceleration rate is a rate selected to provide a predetermined efficiency of operation for a hybrid power train system. Efficiency of operation may be measured by consumption of battery usage life over a scheduled period of time, fuel mileage of a vehicle associated with the hybrid power train, ton-mileage transported per unit of fuel for a vehicle associated with the hybrid power train, and/or a utilization of service brakes during the deceleration where a lower usage of the service brakes is associated with a higher efficiency of operation.

The target deceleration rate may be a prescribed deceleration value (e.g. −0.3 g deceleration), a prescribed torque value (e.g. −100 ft-lb of torque), or a value that is determined as a function of another value in the system. In one example, the target deceleration rate is a function of another system parameter—for example and without limitation a vehicle speed or an engine speed.

Figure 3:
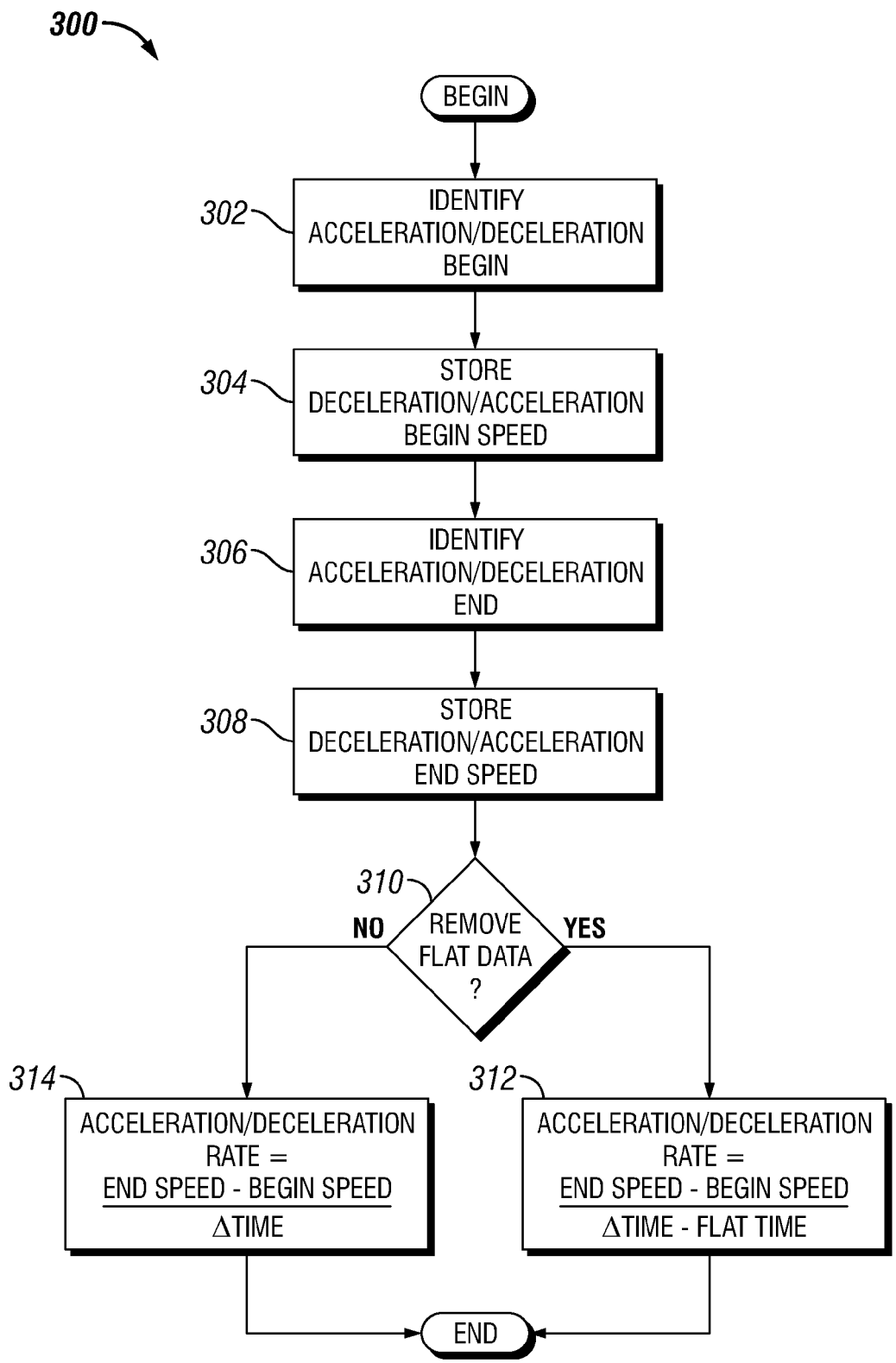
FIG. 3 is a schematic flow diagram of a procedure to detect a vehicle acceleration event.

The operation to detect the deceleration event may be performed by any method understood in the art. Exemplary operations to detect a deceleration include marking a deceleration beginning time and speed, marking a deceleration ending time and speed, and determining the deceleration event in response to the beginning and ending time, and the beginning and ending speed. An exemplary operation is illustrated in FIG. 3. The procedure 300 includes an operation 302 to identify an acceleration or deceleration beginning. The operation 302 may be determined in response to the accelerated parameter (e.g. vehicle speed or engine speed) exhibiting a threshold increase or decrease within a specified period of time. The procedure 300 further includes an operation 304 to store the acceleration or deceleration beginning speed. The operation 304 to store includes any storage operation, including storing the beginning speed in RAM, in a memory location on a computer readable storage device, and/or holding the beginning speed in a temporary buffer.

The procedure 300 further includes an operation 306 an operation to identify an end to the acceleration or deceleration event. The operation 306 includes any operation to identify the end of the acceleration or deceleration event. Exemplary operations 306 include determining that the accelerated parameter exhibits a threshold reversal of the increase or decrease within a specified time period, or determining that the accelerated parameter has failed to change by a specified amount over the period of time. In one example, a deceleration is detected to begin at operation 304 when a vehicle speed drops by a specified amount within a specified period of seconds (e.g. 4 mph within 5 seconds), and the deceleration is detected to end when the vehicle speed fails to drop by a second specified amount is a second specified period of seconds (e.g. 2 mph within 10 seconds) during a period where the deceleration is active. The provided examples are non-limiting.

The procedure 300 further includes an operation 308 to store the acceleration or deceleration ending speed. The operation 308 to store includes any storage operation, including storing the beginning speed in RAM, in a memory location on a computer readable storage device, and/or holding the beginning speed in a temporary buffer. The procedure 300 includes a determination 310 whether to remove flat data from the acceleration or deceleration data set. In certain embodiments, the acceleration or deceleration rate during the acceleration or deceleration event is calculated from the overall average for the event. For example, where all of the data is utilized, the procedure 300 includes an operation 314 to determine the acceleration or deceleration rate from the ending speed, beginning speed, and the change in time over the event.

Alternatively, the acceleration or deceleration event may include flat spots—periods where although the acceleration or deceleration nominally continues, the rate of acceleration or deceleration drops and is potentially less significant. For example, a driver of a vehicle may slow the vehicle by releasing the accelerator or by reducing the accelerator pedal position to a low level that provides for a net negative torque under the present operating conditions, thereby causing a slow deceleration of the vehicle. The driver may intermittently stab the service brake pedal, causing several sharp decelerations within the overall deceleration event. An embodiment including the flat spots will mark the deceleration event as either one long, overall deceleration event having the average amount of deceleration through brake stabs and nominal deceleration, or alternatively mark the deceleration event as several separate deceleration events, with the nominal deceleration operations providing deceleration at a level that triggers the procedure 300 to mark an end of the deceleration event after each brake stab.

Where the procedure includes the determination 310 to exclude flat spots, the procedure 300 proceeds with the operation 312 to determine the acceleration or deceleration rate with flat spots excluded. The time of the flat spots is excluded from the average determination, and further any speed decline during periods estimated to be a flat spot are excluded. For example, and without limitation, an overall deceleration event includes three brake stabs, a first from 40 mph to 32 mph, a second from 29 mph to 23 mph, and a third from 18 mph to 6 mph. The operation 312 includes the total deceleration (end speed−begin speed) as 25 mph (40 mph to 6 mph, less the portion of the speed decrease that occurred during nominal deceleration) and the total time as the time elapsed during the sum of the brake stab operations. Where flat data is excluded, data is determined to be flat by having an acceleration or deceleration value below a threshold value. The utilization of flat data, or the removal of flat data, allows the procedure 300 to target only the more significant acceleration or deceleration events, or to target only the most significant portions of acceleration or deceleration events.

The exemplary procedure includes an operation (not shown) to determine a deceleration improvement opportunity and/or an acceleration improvement opportunity. Determining the acceleration/deceleration improvement opportunity includes comparing the observed acceleration/deceleration event to the target acceleration/deceleration rate. The acceleration/deceleration improvement opportunity may be determined from a magnitude of a difference between the observed acceleration/deceleration event to the target acceleration/deceleration rate, and/or from an integrated area between two curves representing the observed acceleration/deceleration event and the target acceleration/deceleration rate.

Figure 4:
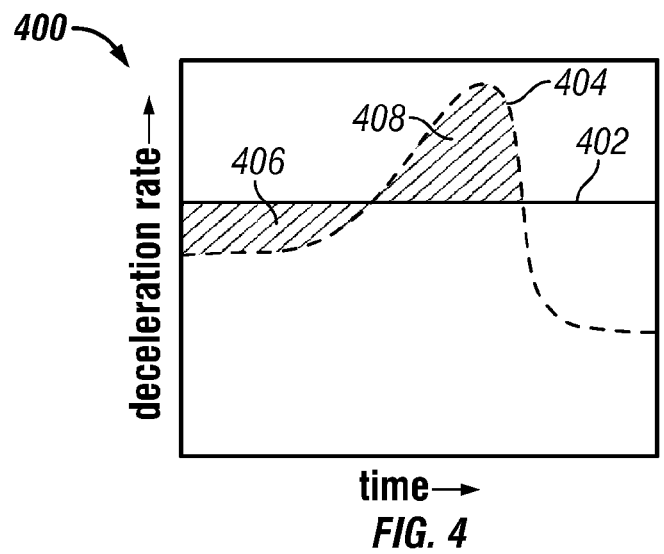
FIG. 4 depicts illustrative data of a deceleration target and observed deceleration.

For example referencing FIG. 4, illustrative data 400 shows a deceleration rate plotted against time. A first curve 402 indicates the target deceleration rate, and a second curve 404 indicates an observed deceleration rate. The deceleration rate units may be speed/time, the magnitude of accelerating force (e.g. net torque), or any other units that can be correlated to acceleration/deceleration as understood in the art. The illustrative data 400 includes a first area 406 over a period of time where the observed deceleration 404 is lower than the target deceleration rate 402, and a second area 408 over a period of time where the observed deceleration rate 404 is higher than the target deceleration rate 402. Exemplary operations include integrating the entire absolute value of the areas 406, 408 to determine a deceleration improvement opportunity, and/or bifurcating the areas 406, 408 into a first deceleration improvement opportunity corresponding to the first area 406, and a second deceleration improvement opportunity corresponding to the second area 408.

Deceleration events where the observed deceleration rate 404 is lower than the target deceleration rate 402 result, in average, in lower regeneration of vehicle kinetic energy than is desired due to overreliance on friction or other normal losses to provide the decelerating force. Accordingly, a deceleration rate 404 lower than the target deceleration rate 402 can negatively impact fuel economy. Deceleration events where the observed deceleration rate 404 is higher than the target deceleration rate 402 result, in average, in overreliance on non-regenerative braking because the regenerative braking is either not capable of the required high braking power, or the electrical storage system is not able to absorb the rate of storage required to capture all of the power provided. The target deceleration rate 402 is constant over time in the example of FIG. 4, but the target deceleration rate 402 may vary according to the varying operating conditions of the system over time.

In response to the acceleration/deceleration improvement opportunity, an exemplary procedure provides a specific operator guidance output. The specific operator guidance output includes at least a direction of change for the acceleration/deceleration (i.e. increase or decrease the acceleration/deceleration magnitude) and at least one correlating operating condition. An exemplary specific operator guidance includes an instruction to increase or decrease braking aggressiveness, along with a correlated vehicle speed and/or gear range. For example, referencing FIG. 4, the area 406 indicates a more aggressive deceleration event, and the deceleration occurs over a vehicle speed range (not shown). As the driver of the vehicle performs multiple deceleration events through similar speed ranges (e.g. slowing from 45 mph to a stop light), multiple areas similar to 406 may be determined that will tend to correlate to the similar speed ranges. Accordingly, a specific operator guidance can be provided to the operator for each event observed, or a statistically significant number of events may be accumulated before a specific operator guidance is provided.

In one example, a specific operator guidance includes an instruction to increase or decrease the aggressiveness of an acceleration or deceleration, and a specific speed range over which the instruction is to be performed—e.g. "decrease deceleration rate from 45 mph to 25 mph." The specified speed range may be, in one example, a speed range bounded by the acceleration/deceleration beginning speed and the acceleration/deceleration ending speed determined in the procedure 300. For example, a deceleration beginning speed may be determined at operation 304 to be 68 mph, and the deceleration ending speed may be determined at operation 308 to be 54 mph, and the specific operator guidance may provide an instruction defined from 65 mph to 55 mph. Any speed range may be utilized in the specific operator guidance, including speeds that are extrapolated outside of the beginning and ending speeds utilized to determine the acceleration/deceleration improvement opportunity. In certain embodiments, speed ranges to be reported in the specific operator guidance are selected according to common speed limits known for the application, according to common operating speeds observed during operations, and/or according to predetermined speed ranges.

In certain embodiments, a procedure includes an operation to determine a guidance weighting value in response to the area between the first curve and the second curve (e.g. the areas 406, 408). The specific operator guidance further includes the guidance weighting value. In one example, a fuel economy impact of the driver behavior is estimated from the area 406, 408 and reported in the specific operator guidance. Further in the example, the fuel economy impact may be reported in a percentage (e.g. 2% fuel economy loss due to the exhibited braking behavior), in a fuel economy magnitude (e.g. 0.18 mpg fuel economy loss due to the exhibited braking behavior), an economic impact (e.g. $500/year loss due to the exhibited braking behavior), a unitless quantitative impact (e.g. the braking behavior exhibited by area 406 is an index 55 fuel economy impact, and the braking behavior exhibited by area 408 is an index 75 fuel economy impact), and/or a qualitative impact (e.g. the braking behavior exhibited by area 406 is MEDIUM, and the braking behavior exhibited by area 408 is LARGE).

The provided examples of the guidance weighting value are exemplary and non-limiting. Similar concepts will be understood to one of skill in the art, having the benefit of the disclosures herein, for service brake life, battery life, or other parameters that can be impacted by optimization of accelerations and decelerations. In certain embodiments, the guidance weighting value can be utilized by the operator, a fleet or vehicle owner, or other person utilizing the specific operator guidance to prioritize behavior correction. In certain embodiments, the guidance weighting value is utilized to determine how to display the specific operator guidance, for example declining to display a specific operator guidance that has a guidance weighting value below a threshold.

Figure 5:
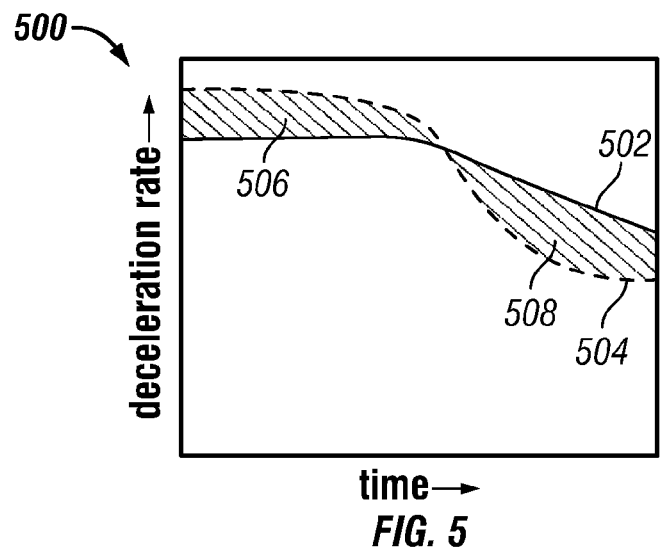
FIG. 5 depicts a second set of illustrative data of a deceleration target and observed deceleration.

Referencing FIG. 5, illustrative data 500 showing a first curve 502 that is a target deceleration rate 502 is illustrated. The target deceleration rate 502 decreases over time, in response to an operating condition change (not shown), for example a vehicle speed decrease that occurs over the time in the illustrative data 500. A second curve 504 shows observed deceleration rate data. An area 506 indicates a period of time where the observed deceleration rate is higher than the target rate, and a second area 508 illustrates a period of time where the observed deceleration rate is lower than the target deceleration rate. The first area 506 corresponds, in one example, to an operator braking at a rate that exceeds a regenerative capacity of the electrical system. The second area 508 corresponds, in one example, to an operator braking at a rate that is lower than the regenerative capacity of the electrical system.

Figure 6:
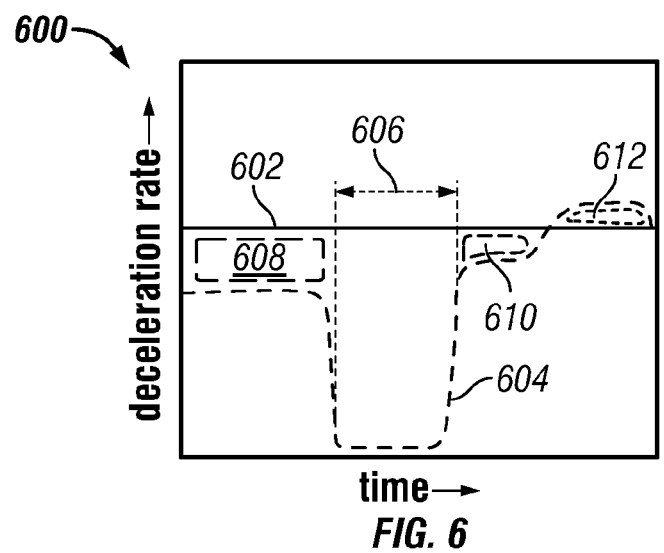
FIG. 6 depicts a third set of illustrative data of a deceleration target and observed deceleration.

Referencing FIG. 6, illustrative data 600 showing a first curve 602 that is a target deceleration rate 602 is illustrated. A second curve 604 shows observed deceleration rate data. A first area 608 illustrates a time period when an operator is decelerating at a rate lower than the target deceleration rate. A time range 606 indicates a period where the operator is decelerating at a very small rate. The time range 606 may correlate to a pause in the operator deceleration attempt—for example allowing the vehicle to coast with the accelerator depressed slightly. In certain embodiments, the time range 606 may correspond to a flat spot in the deceleration event, and an exemplary procedure may ignore the time and deceleration that occurs during the time range 606. An alternate or additional embodiment may accumulate the first area 608 as a first decelaration event, and accumulate the second area 610 and third area 612 as a second deceleration event. The area 610 corresponds to a second time period where the observed deceleration is below the target deceleration rate, and the area 612 corresponds to a third time period where the observed deceleration is above the target deceleration rate.

An exemplary procedure further includes displaying the specific operator guidance on an operator visible display—for example on a dashboard device or other in-vehicle device. Another operator visible display may include displaying the specific operator guidance in conjunction with an electronic log output—for example as a notation on an electronic log report. Another exemplary procedure includes providing the specific operator guidance as a parameter stored on a memory location, accessible to a service tool and/or fleet data reporting device. Yet another exemplary procedure includes providing the specific operator guidance to a datalink or other externally accessible communication device.

In certain embodiments, the specific operator guidance is provided to a datalink for download to an external computing device. The data on the external computing device may be sorted, prioritized, or otherwise processed before utilization. Utilization of the data includes providing targeted behavior feedback to the operator of the vehicle to improve specific driving behaviors such as acceleration or deceleration rates at specific speed ranges. Other exemplary uses of the data include fleetwide directives or training based on accumulated data from a number of specific operator guidance values from a number of controllers, guidance for procurement of future vehicles to calibrate certain settings (e.g. engine torque ratings, cruise speed range availability, etc.) according to the accumulated specific operator guidance data, and/or guidance for original equipment manufacturers to provide vehicle features in response to accumulated specific operator guidance data.

In certain embodiments, a procedure includes an operation to determine the target deceleration rate in response to a torque value corresponding to a maximum regeneration torque value. The maximum regeneration torque value corresponds to the maximum generating capacity of a motor/generator or generator in a system, and is known to one of skill in the art contemplating a particular system. The maximum regeneration torque value utilized to determine the target deceleration rate may be a function of the vehicle speed, allowing the maximum regeneration torque value to be a particular torque trajectory as a function of vehicle speed. Alternatively, the maximum regeneration torque value utilized to determine the target deceleration rate may be the maximum regeneration capacity of the generator at any speed (typically, the maximum speed). Utilizing a torque trajectory correlated to vehicle speed teaches the driver to brake at the level of maximum recovery of kinetic energy with a lower percentage of the kinetic energy dissipated in the electrical system (e.g. as negative motoring torque), while still providing the operator with a consistent braking feel from the electrical braking system. Utilizing a maximum torque available from the generator at any speed teaches the driver to brake at the maximum regeneration capability of the electrical system, even where the electrical system is not fully capable to store the energy at all operating points.

In certain embodiments, the maximum regeneration torque value utilized to determine the target deceleration rate may be a function of the generator speed. However, the generator speed is not typically a parameter that the operator has operational awareness of, and therefore utilizing the generator speed to determine the target deceleration rate is not helpful to teach the operator desired braking behavior. Nevertheless, in certain embodiments, the generator speed may be utilized to determine the target deceleration rate, not exclusively but typically in systems where the operator controls, observes, or interacts with the generator speed.

In certain embodiments, a procedure includes determining a target acceleration rate in response to a torque value corresponding to an acceleration event battery energy consumption target. For example, each acceleration event utilizing the electrical system to provide acceleration power also utilizes an amount of battery energy. Each deceleration event that utilizes regenerative braking provides an amount of energy back to the battery. If the battery is fully charged before the deceleration event occurs, the regenerative braking cannot store the amount of energy back to the battery. Accordingly, it is desirable at least at certain operating points to partially discharge the battery during acceleration events such that the battery has capacity to recover kinetic energy upon braking. However, if the battery cycles power too often, the battery life will be reduced below the designed battery life. The acceleration event battery energy consumption target is selected to provide the desired amount of battery discharge per acceleration event. In response to the acceleration event battery energy consumption target, the target acceleration rate can be determined from the power capability of an internal combustion engine in the system, and from an estimate of the target speed to which the vehicle is going to be accelerated.

Another exemplary set of embodiments includes a procedure having an operation to determine a target vehicle acceleration profile, an operation to detect a vehicle acceleration event, and an operation to determine an acceleration improvement opportunity in response to the target vehicle acceleration profile and the vehicle acceleration event. The term acceleration, as used herein, includes negative acceleration or deceleration. Further, throughout this description, wherever an operation herein describes acceleration or deceleration, unless explicitly stated to the contrary, the operation utilizing deceleration or acceleration is also contemplated herein. The exemplary procedure further includes providing a specific operator guidance output in response to the acceleration improvement opportunity.

A further exemplary procedure includes an operation to determine the target acceleration profile as a function of an absolute value of the acceleration, and/or a function of a vehicle speed. The exemplary procedure further includes selecting the target acceleration profile to maximize fuel economy, service brake life, and/or battery life. An exemplary procedure further includes an operation to provide the specific operator guidance as language-based output available to the operator during the operation of the vehicle.

As is evident from the figures and text presented above, a variety of embodiments according to the present invention are contemplated.

An exemplary set of embodiments is a method including determining a target deceleration rate, detecting a vehicle deceleration event, and determining a deceleration improvement opportunity in response to the target deceleration rate and the vehicle deceleration event. The method further includes providing a specific operator guidance output in response to the deceleration improvement opportunity. Certain further exemplary embodiments of the method are described following.

An exemplary method further includes performing the detecting by determining a deceleration initiation speed, a deceleration termination speed, and computing an average deceleration rate between the initiation speed and the termination speed. Another exemplary method includes performing the detecting by determining an average deceleration rate between two speeds bounded by the initiation speed and the termination speed. An exemplary specific operator guidance includes a deceleration change parameter and a speed range.

An exemplary method further includes determining the deceleration improvement opportunity by integrating an area between a first curve corresponding to the target deceleration rate and a second curve corresponding to the vehicle deceleration event. A further embodiment includes determining a guidance weighting value in response to the area between the first curve and the second curve, where the specific operator guidance further includes the guidance weighting value.

An exemplary method further includes displaying the specific operator guidance on an operator visible display. Yet another exemplary method includes determining the target deceleration rate in response to a torque value corresponding to a maximum regeneration torque value. Another exemplary method includes providing the specific operator guidance by directing an operator to increase a deceleration rate in response to the vehicle deceleration event having a deceleration rate that is lower than the target deceleration rate.

An exemplary method further includes determining a target acceleration rate, detecting a vehicle acceleration event, and providing the specific operator guidance further in response to the target acceleration rate and the vehicle acceleration event. A further embodiment includes determining the target acceleration rate in response to a torque value corresponding to an acceleration event battery energy consumption target.

Another exemplary set of embodiments is a method including determining a target vehicle acceleration profile, detecting a vehicle acceleration event, and determining an acceleration improvement opportunity in response to the target vehicle acceleration profile and the vehicle acceleration event. The method further includes providing a specific operator guidance output in response to the acceleration improvement opportunity. Certain further exemplary embodiments of the method are described following.

A further embodiment includes the target acceleration profile being a function of an absolute value of the acceleration, and/or a function of a vehicle speed. The exemplary method further includes selecting the target acceleration profile to maximize fuel economy, service brake life, and/or battery life. An exemplary method further includes providing the specific operator guidance as language-based output available to the operator during the operation of the vehicle.

Another exemplary set of embodiments is an apparatus including a deceleration definition module that interprets a target deceleration rate, a deceleration detection module that identifies a vehicle deceleration event, and a deceleration quality module that identifies a deceleration improvement opportunity in response to the target deceleration rate and the vehicle deceleration event. The apparatus further includes an operator feedback module that provides a specific operator guidance in response to the deceleration improvement opportunity. Certain further exemplary embodiments of the method are described following.

An exemplary apparatus further includes an operator compartment display responsive to the specific operator guidance. A further embodiment includes an acceleration definition module that interprets a target acceleration rate, an acceleration detection module that identifies a vehicle acceleration event, and an acceleration quality module that identifies an acceleration improvement opportunity in response to the target acceleration rate and the vehicle acceleration event. The operator feedback module further provides the specific operator guidance in response to the acceleration improvement opportunity.

An exemplary apparatus further includes a battery life cycle module that interprets a battery charge cycling target value and a battery charge cycling rate, and further adjusts the target acceleration rate in response to the battery charge cycling target value and the battery charge cycling rate. Another exemplary apparatus includes an accumulated regeneration module that interprets an accumulated regeneration target profile and an accumulated regeneration energy amount, and further adjusts the target deceleration rate and/or the target acceleration rate in response to the accumulated regeneration target profile and the accumulated regeneration energy amount. Yet another exemplary apparatus includes a battery life cycle module that interprets a battery charge cycling target value and a battery charge cycling rate, and further adjusts the target deceleration rate in response to the battery charge cycling target value and the battery charge cycling rate.

Another exemplary set of embodiments includes a system having a vehicle, where the vehicle includes a hybrid power train having two power sources. One of the power sources includes a regenerative device that intermittently recovers vehicle kinetic energy. The vehicle further includes a service brake that dissipates the vehicle kinetic energy. The system further includes a controller having modules structured to functionally execute operations to provide useful driver feedback. The controller includes a deceleration definition module that interprets a target deceleration rate, a deceleration detection module that identifies a vehicle deceleration event, a deceleration quality module that identifies a deceleration improvement opportunity in response to the target deceleration rate and the vehicle deceleration event, and an operator feedback module that provides a specific operator guidance in response to the deceleration improvement opportunity.

An exemplary system further includes an operator visible display responsive to the specific operator guidance. Yet another exemplary system includes the operator feedback module further structured providing the specific operator guidance to a datalink.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining, with a controller, a target deceleration rate;
   detecting a vehicle deceleration event;
   determining a battery charge cycling target value and a battery charge cycling rate;
   adjusting the target deceleration rate in response to the battery charge cycling target value and the battery charge cycling rate;
   determining a deceleration improvement opportunity in response to the target deceleration rate and the vehicle deceleration event; and
   providing a specific operator guidance output from the controller in response to the deceleration improvement opportunity.

2. The method of claim 1, wherein the detecting comprises determining a deceleration initiation speed, a deceleration termination speed, and computing an average deceleration rate between the initiation speed and the termination speed.

3. The method of claim 1, wherein the detecting further comprises determining an average deceleration rate between two speeds bounded by the initiation speed and the termination speed.

4. The method of claim 1, wherein the specific operator guidance comprises a deceleration change parameter and a speed range.

5. The method of claim 1, wherein determining the deceleration improvement opportunity comprises integrating an area between a first curve corresponding to the target deceleration rate and a second curve corresponding to the vehicle deceleration event.

6. The method of claim 5, further comprising determining a guidance weighting value in response to the area between the first curve and the second curve, wherein the specific operator guidance further comprises the guidance weighting value.

7. The method of claim 1, further comprising displaying the specific operator guidance on an operator visible display.

8. The method of claim 1, further comprising determining the target deceleration rate in response to a torque value corresponding to a maximum regeneration torque value.

9. The method of claim 1, further comprising providing the specific operator guidance by directing an operator to increase a deceleration rate in response to the vehicle deceleration event having a deceleration rate that is lower than the target deceleration rate.

10. The method of claim 1, further comprising determining a target acceleration rate, detecting a vehicle acceleration event, and providing the specific operator guidance further in response to the target acceleration rate and the vehicle acceleration event.

11. The method of claim 10, further comprising determining the target acceleration rate in response to a torque value corresponding to an acceleration event battery energy consumption target.

12. A method, comprising:
   determining, with a controller, a target vehicle acceleration profile of a vehicle with a hybrid powertrain;
   detecting a vehicle acceleration event from operating data of the vehicle;
   determining a battery charge cycling target value and a battery charge cycling rate for a battery of the hybrid powertrain;
   adjusting the target vehicle acceleration profile in response to the battery charge cycling target value and the battery charge cycling rate;
   determining an acceleration improvement opportunity during operation of the hybrid powertrain in response to the adjusted target vehicle acceleration profile and the vehicle acceleration event; and
   providing a specific operator guidance output from the controller for controlling acceleration of the vehicle in response to the acceleration improvement opportunity.

13. The method of claim 12, wherein the target acceleration profile is a function of an absolute value of the acceleration.

14. The method of claim 12, wherein the target acceleration profile is a function of a vehicle speed.

15. The method of claim 12, further comprising selecting the target acceleration profile to maximize a parameter selected from the parameters consisting of: fuel economy, service brake life, and battery life.

16. The method of claim 12, further comprising providing the specific operator guidance as language-based output available to the operator during the operation of the vehicle.

17. An apparatus, comprising:
   an electronic controller operably connected to receiving vehicle operating data from a vehicle including a hybrid powertrain, wherein the controller includes a plurality of modules implemented as at least one of a hardware component and a computer readable medium of the electronic controller, the modules including:
   a deceleration definition module structured to interpret a target deceleration rate for the vehicle;
   a deceleration detection module structured to identify a vehicle deceleration event from the vehicle operating data;
   a deceleration quality module structured to identify a deceleration improvement opportunity during operation of the hybrid powertrain in response to the target deceleration rate and the vehicle deceleration event; and
   an operator feedback module structured to provide a specific operator guidance for controlling deceleration of the vehicle in response to the deceleration improvement opportunity.

18. The apparatus of claim 17, further comprising an operator compartment display responsive to the specific operator guidance.

19. The apparatus of claim 17, further comprising an acceleration definition module structured to interpret a target acceleration rate, an acceleration detection module structured to identify a vehicle acceleration event, and an acceleration quality module structured to identify an acceleration improvement opportunity in response to the target acceleration rate and the vehicle acceleration event, wherein the operator feedback module is further structured to provide the specific operator guidance in response to the acceleration improvement opportunity.

20. The apparatus of claim 19, further comprising a battery life cycle module structured to interpret a battery charge cycling target value and a battery charge cycling rate for a battery of the hybrid powertrain, and further structured to adjust the target acceleration rate in response to the battery charge cycling target value and the battery charge cycling rate.

21. The apparatus of claim 19, further comprising an accumulated regeneration module structured to interpret an accumulated regeneration target profile and an accumulated regeneration energy amount, and further structured to adjust at least one of the target deceleration rate and the target acceleration rate in response to the accumulated regeneration target profile and the accumulated regeneration energy amount.

22. The apparatus of claim 17, further comprising a battery life cycle module structured to interpret a battery charge cycling target value and a battery charge cycling rate for a battery of the hybrid powertrain, and further structured to adjust the target deceleration rate in response to the battery charge cycling target value and the battery charge cycling rate.

23. A system, comprising:
   a vehicle having a hybrid power train comprising two power sources, wherein one of the power sources comprises a regenerative device structured to intermittently recover vehicle kinetic energy;
   the vehicle further comprising a service brake that dissipates the vehicle kinetic energy;
   a controller, comprising:
      a deceleration definition module structured to interpret a target deceleration rate;
      a deceleration detection module structured to identify a vehicle deceleration event;
      a battery life cycle module structured to interpret a battery charge cycling target value and a battery charge cycling rate, and further structured to adjust the target deceleration rate in response to the battery charge cycling target value and the battery charge cycling rate;
      a deceleration quality module structured to identify a deceleration improvement opportunity in response to the adjusted target deceleration rate and the vehicle deceleration event; and
      an operator feedback module structured to provide a specific operator guidance in response to the deceleration improvement opportunity.

24. The system of claim 23, further comprising an operator visible display responsive to the specific operator guidance.

25. The system of claim 23, wherein the operator feedback module is further structured to provide the specific operator guidance to a datalink.

26. The system of claim 25, further comprising an external computer structured to access the datalink and receive the specific operator guidance.

* * * * *